Patented Nov. 4, 1941

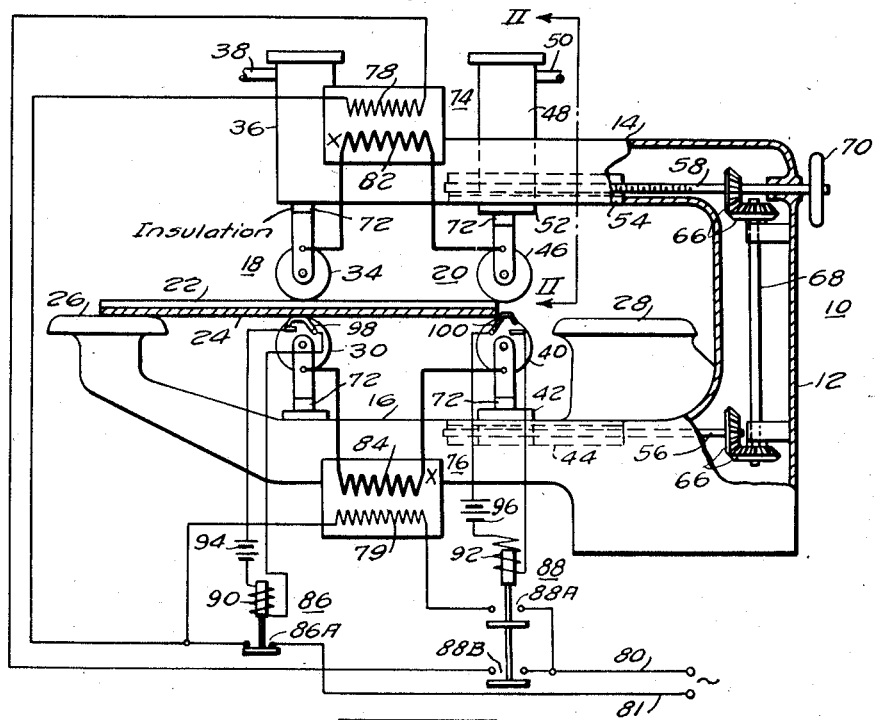

2,261,694

UNITED STATES PATENT OFFICE 2,261,694

WELDING WIDE SHEETS

Walter Meenen, Berlin-Friedenau, Germany, assignor to Westinghouse Electric & Manufacturing Company, East Pittsburgh, Pa., a corporation of Pennsylvania Application August 2, 1940, Serial No. 349,466
In Germany June 21, 1939

5 Claims. (Cl. 219—4)

My invention relates generally to welding, and it has reference in particular to welding apparatus and a method for welding relatively wide sheets or strips of metal.

The present invention relates particularly to welding apparatus and a welding method for carrying out the process of joining together relatively wide strips of metal, a process that has to be performed, for example, in steel mills where strips of metal of exceptionally great length have to be manufactured. It is difficult to produce in this instance a weld that is sound and fully reliable over the entire width of the strip. In the course of producing such a weld in the usual manner the steel strip enters more and more during the welding process the region bounded by the supporting arms that carry the electrode members. As a consequence thereof the inductance of the welding circuit changes, causing a decrease in the amount of power supplied to the weld. This has the result that over perhaps the entire second half of the length of the weld, and certainly over the end portion of the second half of the weld, the ends of the strips will either not be properly welded together or will not be welded together at all.

Generally stated, it is an object of my invention to provide in a simple and efficient manner for satisfactorily welding together relatively wide strips or sheets of steel or the like.

More specifically, it is an object of my invention to provide for joining relatively wide strips of steel or the like by passing the strips between a plurality of pairs of electrode members positioned substantially along the line of the weld between the strips in predetermined spacial relation and simultaneously producing aligned welds by passing electric currents through at least two pairs of the electrode members and the strips in series circuit relation.

Another object of the invention is to provide for welding relatively wide strips of metal by a plurality of substantially aligned seam welds simultaneously produced in end-to-end relation.

A further object of the invention is to provide welding apparatus for seam welding relatively wide sheets or strips of metal wherein a plurality of pairs of electrode members are energized in series circuit relation by means of transformers positioned on opposite sides of the strips so as to prevent variations in the inductance of the welding circuit by reason of the movement of the strips relative to the electrode members.

Yet another object of my invention is to provide for joining relatively wide strips of ferrous materials by simultaneously passing welding currents therethrough from electrode members associated in paired relation at a plurality of points along the line of the weld and moving the strips relative to the electrode members to simultaneously produce a plurality of seam welds in end-to-end relation.

Still another object of my invention is to provide welding apparatus for joining relatively wide strips of steel or the like and having a plurality of pairs of electrode members positioned along the line of the weld energized by transformers located on the same side of the strips as the electrode members, and so connected thereto as to provide a welding circuit between at least two of the pairs of electrode members, the inductance of which remains substantially unaffected by the movement of the strips relative to the said pairs of electrode members.

A yet further object of my invention is to provide a method of joining relatively wide strips of steel or the like wherein the strips are passed between a plurality of pairs of rotatable electrode members having a predetermined spacing along the line of the weld dependent on the width of the strips and are welded by simultaneously passing electric currents through the strips from the electrode members at a plurality of points in series circuit relation so as to simultaneously produce a plurality of aligned welds in end-to-end relation.

Other objects will, in part, be obvious, and will, in part, be explained hereinafter.

In accordance with the present invention, I propose to avoid the troublesome situation heretofore caused by the variation in the inductance of the welding circuit as the strips being welded move relative to the electrode members by utilizing welding apparatus wherein two pairs of electrode members are connected to transformers located above as well as below the strips being welded in such a manner that the two pairs of electrode members are connected in a welding circuit in series circuit relation with the strips therebetween. With this arrangement, two transformers are used and the distance between the two pairs of electrode members is made substantially equal to one-half of the width of the strips whose ends are to be welded together. The welding process is then carried out by causing one pair of electrode members to produce the portion of the weld extending from the front edge to the center of the strips, while the other pair of electrode members is caused to produce simultaneously that portion of the weld extending from the center to the rear edge of the strips.

This arrangement has two major advantages. In the first place, the space between the two pairs of electrode members is occupied by at least a portion of the strips to be welded during the entire welding period, so that during the welding period there is no change in the inductance of any current carrying circuits within the said space on account of the displacement of the strips during the welding period which results as a consequence of the feed motion imparted to the strips. Since the space between the pair of electrode members nearest the machine frame and the frame itself is not encircled by current carrying conductors, the inductance of the welding circuit is unaffected by the movement of the strips being welded within this space. Furthermore, the welding output may be doubled or more than doubled by simultaneously welding at two or more pairs of electrode members, so that the welding period may be reduced by fifty per cent or more.

For a more complete understanding of the nature and scope of my invention, reference may be had to the accompanying drawing in which:

Figure 1 is a diagrammatic view, partly in section, of welding apparatus embodying the principal features of the invention, and Fig. 2 is an enlarged cross-sectional view along the line II—II of Fig. 1 showing how the upper movable electrode member may be mounted.

Referring to Fig. 1, the reference numeral 10 may denote generally a seam welding machine suitable for carrying out the welding method of the invention. The frame 12 of the welding machine may be of any suitable construction, having upper and lower support arms 14 and 16, respectively, for supporting the pairs of relatively movable electrode members 18 and 20 which are disposed to engage the strips 22 and 24 to be joined by welding. Suitable means, such as the tables 26 and 28 may be provided for supporting the strips in the proper position relative to the electrode members.

The pair of electrode members 18 may comprise a relatively fixed rotatable lower electrode roll 30, which may be supported on the lower support arm 16 in any suitable manner, and a corresponding rotatable upper electrode roll 34, which may be so supported as to be movable in a vertical direction relative to the lower electrode roll 30. For example, the electrode roll 34 may be operatively connected to a piston slidably positioned in a fluid pressure cylinder 36 which may be mounted on the upper support arm 14 in any suitable manner, and provided with a fluid pressure conduit 38 for connection to a suitable source of fluid pressure.

The pair of electrode members 20 may be mounted on the upper and the lower support arms of the frame 12 so as to be movable relative to the pair of electrode members 18 in a horizontal direction. The lower electrode member may comprise a rotatable electrode roll 40 which may be mounted on a support member 42 adapted to slide horizontally along the lower support arm 16 on suitable guide members 44. The upper electrode member may likewise comprise a rotatable electrode roll 46, which may be disposed for movement relative to the electrode roll 40 in a vertical direction by being operatively connected to a piston which is slidably positioned within a fluid pressure cylinder 48 provided with a fluid pressure conduit 50 for connection to a suitable source of fluid pressure. The cylinder 48 may be slidably supported by being mounted on a support member 52 which is adapted to slide horizontally along the upper support arm 14 on guide members 54 in a manner similar to that of the lower electrode roll 40. Suitable driving means may be provided for feeding the strips relative to the electrode rolls, the electrode roll 30 being for example, operatively connected in a well known manner to a source of motive power such as a motor (not shown).

In order to provide for moving the pair of electrode members 20 horizontally with respect to the pair of electrode members 18, suitable motion transmitting means may be provided. Referring to Figs. 1 and 2 of the drawing, it may be seen that means such as the threaded shafts 56 and 58 may be respectively connected to the relatively movable pair of electrode members 20. For example, as shown in Fig. 2, projecting lugs 60 may be provided on the sides of the cylinder 48 of the upper electrode roll 46, for engaging the upper sides of the guide members 54, and a threaded opening 64 may be provided in one of said projecting lugs for receiving the threaded shaft 58. Similar provisions may also be made with regard to the lower electrode roll 40. The shafts 56 and 58 may be operatively connected in any suitable manner for moving the upper and lower electrode rolls 40 and 46 in unison, such as by means of the bevel gears 66 and the connecting shaft 68, so that both of the shafts 56 and 58 may be simultaneously rotated by means of a handwheel 70.

The electrode members 30, 34, 40 and 46 may be insulated from the frame 12 in any suitable manner such as by means of the interposed insulation 72. Suitable means may be provided for energizing the upper electrode members or rolls 34 and 46 and the lower electrode members or rolls 30 and 40 so that the welding current flows therebetween and through the strips 22 and 24 which are to be welded, in series circuit relation. Accordingly, welding transformers 74 and 76 may be positioned on the upper and lower support arms 14 and 16, respectively, having primary windings 78 and 79 disposed to be connected by means of conductors 80 and 81 to a suitable source of alternating current. The secondary windings 82 and 84 of the transformers may be connected to the upper electrode members 34 and 46, and the lower electrode members 30 and 40, respectively. The primary and secondary windings of the transformers 74 and 76 may be so related that the upper and lower electrode rolls of the respective pairs of electrode members 18 and 20 are of the opposite polarity, so that welding current will flow through the strips being welded and through the secondary windings 82 and 84 in series circuit relation. The primary and secondary windings may, for example, be so related that the terminals marked (x) are of the same instantaneous polarity.

With a view to controlling the energization of the electrode rolls so that they will be energized only during the interval in which the strips to be welded are engaged by both pairs of electrode rolls, suitable means may be provided for controlling the energization thereof in accordance with the position of the strips being welded. Control switches 86 and 88 may be provided for connecting the opposite terminals of the transformers 74 and 76 to the source of alternating current. The operating windings 90 and 92 thereof may be connected to a suitable source of control voltage such as the batteries 94 and 96, respectively, by means such as the limit switches 98 and 100, which may be positioned adjacent the lower electrode rolls 30 and 40, respectively, so as to be actuated by the strips which are being welded when they pass between the respective pairs of electrode rolls.

In welding the relatively wide strips in accordance with my invention, the strips may be supported on the table 26 and fed by suitable driving means between the electrode rolls 30 and 34. Upon the engagement of the strips by the electrode rolls 30 and 34, the limit switch 98 is actuated, completing an energizing circuit for the operating winding 90 of the control switch 86. The control switch operates, connecting one terminal of the primary windings 78 and 79 to the source of alternating current. Since the control switch 88 is in the normally deenergized position, the welding transformers 74 and 76 are not energized. The pair of relatively movable electrode members 20 are preferably positioned at a distance from the pair of electrode members 18 substantially equal to one-half of the width of the strips 22 and 24 that are to be welded. As soon as the front edge of the strips is engaged by the electrode rolls 40 and 46, the limit switch 100 is actuated to complete an energizing circuit for the operating winding 92 of the control switch 88. The control switch 88 operates and its contact members 88A and 88B are closed so as to effect the energization of the primary windings 78 and 79 of the welding transformers 74 and 76 from the source of alternating current. As the welding strips move progressively between the pairs of electrode members 18 and 20, aligned seam welds are produced thereby, extending from the front edge of the strips and from the mid-point thereof to the mid-point and to the rear edge, respectively. The instant that the rear edge of the strips is disengaged by the electrode members 30 and 34, the limit switch 98 is released and interrupts the energizing circuit of the operating winding 90 of the control switch 86. The control switch 86 returns to the deenergized positon, opening contact members 86A, disconnecting the primary windings 78 and 79 of the welding transformers from the source, and terminating the welding operation.

From the above description and the accompanying drawing it will be apparent that I have provided welding apparatus and have disclosed a method of welding relatively wide strips therewith, whereby new and important results are obtained. The welding apparatus of my invention is of a relatively simple construction and may be easily manufactured, or existing welding apparatus may be readily modified in accordance with the principles disclosed in my invention. The method of welding which I have disclosed is relatively simple to practice and relatively wide strips may be welded in this manner so as to secure sound welds, which are fully reliable, across the entire width of the strips.

Instead of using only two pairs of electrode members and two transformers, as hereinbefore described, it will be apparent that it is also possible to use three or more pairs of electrode members, and four or more transformers for energizing the electrode members. Under these conditions each pair of electrode members produces a weld only over one-third, or proportionally less, of the total width of the strip, depending on the number of pairs of welding electrode members that are used.

Since certain changes may be made in the above description and different embodiments of the invention may be made without departing from the spirit thereof, it is intended that all the matter contained in the above description or shown in the accompanying drawing shall be considered as illustrative and not in a limiting sense.

I claim as my invention:

1. Welding apparatus comprising, a plurality of pairs of relatively movable rotatable electrode members adapted to be positioned in predetermined fixed spaced relation for engaging relatively small areas of a workpiece adapted to be moved relative thereto, means for varying the spacing between the pairs of electrode members, and means associated with each of the pairs of electrode members cooperative for simultaneously energizing said pairs of electrode members while the workpiece is in a predetermined position relative thereto.

2. In welding apparatus, in combination, a plurality of rotatable electrode members associated in paired relation for engaging the upper and lower surfaces of members to be welded in predetermined spaced relation proportional to the length of the weld, transformer means for energizing a pair of the electrode members on the upper side of the members to be welded, additional transformer means for energizing the associated pair of electrode members on the lower side of the members to be welded in series circuit relation with the said pair on the upper side, independent switch means controlling the energization of said transformer means, and control means associated with each of the electrode members operable in response to the positioning of the members to be welded between the associated pairs of electrode members to energize the switch means for simultaneously controlling the energization and deenergization of the transformer means in response to predetermined positioning of the members to be welded.

3. Welding apparatus comprising, a pair of relatively movable rotatable electrode members for engaging the upper and lower sides of members to be welded, an additional pair of relatively movable electrode members for similarly engaging the members to be welded in spaced relation to said first mentioned pair along the line of the weld, means for moving said additional pair of electrode members relative to the said first-mentioned pair of electrode members along the line of the weld to provide a predetermined spacing between said pairs of electrode members directly proportional to the length of the weld and inversely proportional to the number of pairs of electrode members, a transformer positioned above the members to be welded connected to energize the electrode members engaging the upper side of said members, an additional transformer positioned below the said members connected to energize the electrode members engaging the lower side of the said members in series circuit relation with those engaging the upper side, and switch means associated with each of said pairs of electrode members cooperative in response to the positioning of the members to be welded between their associated pairs of electrode members to effect energization of said transformers.

4. Seam welding apparatus comprising, a plurality of pairs of relatively movable rotatable electrode members for progressively engaging the upper and lower surfaces, respectively, of members to be welded as they are moved therebetween, transformer means positioned above the members to be welded connected for energizing a pair of electrode members engaging the upper side of the members to be welded, transformer means positioned below the members to be welded connected for energizing the associated electrode members engaging the lower side of the members to be welded in series circuit relation to said pair of electrode members engaging the upper side, a plurality of switch means jointly operable to effect the energization of the transformer means, and control means associated with each pair of electrode members actuable upon engagement by the members to be welded to render the switch means operative during the interval the members to be welded are engaged by the said pairs of electrode members.

5. In a welding system, in combination, a pair of relatively movable electrode members for progressively engaging the opposite sides of members disposed to be moved therebetween for welding, an additional pair of electrode members positioned in spaced relation with said first-mentioned pair of electrode members and insulated therefrom for similarly engaging the opposite sides of the members to be welded at a point on the line of the weld distant from the first-mentioned pair of electrode means a distance approximately equal to one-half the length of the weld, means for adjustably positioning the said additional pair of electrode members relative to the first-mentioned pair along the line of the weld, a transformer positioned between the upper electrode members of the said pairs having a secondary winding connected thereto and a primary winding disposed to be connected to a source of alternating current, a transformer positioned between the lower electrode members having a secondary winding connected thereto and a primary winding disposed to be connected to the source and so related to the secondary winding as to energize the lower electrode members in opposed relation to the upper electrode members, a control switch associated with each pair of electrode members actuable when the members to be welded are positioned therebetween, and independent switch means normally preventing the energization of the transformers operable in response to the actuation of the control switches to connect the transformers to the source.

WALTER MEENEN.